United States Patent [19]

Asai et al.

[11] Patent Number: 4,779,223

[45] Date of Patent: Oct. 18, 1988

[54] DISPLAY APPARATUS HAVING AN IMAGE MEMORY CONTROLLER UTILIZING A BARREL SHIFTER AND A MASK CONTROLLER PREPARING DATA TO BE WRITTEN INTO AN IMAGE MEMORY

[75] Inventors: Nobuteru Asai, Hitachi; Tadashi Kuwabara, Yokohama; Yasuo Sakai, Hitachi, all of Japan

[73] Assignee: Hitachi, Ltd., Tokyo, Japan

[21] Appl. No.: 816,308

[22] Filed: Jan. 6, 1986

[30] Foreign Application Priority Data

Jan. 7, 1985 [JP] Japan .......................... 60-223

[51] Int. Cl.⁴ ........................ G06F 3/14

[52] U.S. Cl. ........................ 364/900; 340/789; 340/792

[58] Field of Search ............... 340/723, 724, 726, 750, 340/789–792; 364/200 MS File, 900 MS File

[56] References Cited

U.S. PATENT DOCUMENTS

| | | | |
|---|---|---|---|
| 4,069,511 | 1/1978 | Lelke | 364/200 |
| 4,203,154 | 5/1980 | Lampson et al. | 364/200 |
| 4,246,578 | 1/1981 | Kawasaki et al. | 340/750 |
| 4,326,202 | 4/1982 | Kidode et al. | 340/799 |
| 4,352,100 | 9/1982 | O'Connell | 340/723 |
| 4,370,733 | 1/1983 | Gaudio | 364/900 |
| 4,418,344 | 11/1983 | Brown | 340/726 |
| 4,434,472 | 2/1984 | Kachun | 364/900 |
| 4,468,662 | 8/1984 | Tanaka | 340/789 |
| 4,613,852 | 9/1986 | Maruko | 340/703 |
| 4,615,018 | 9/1986 | Sakano | 364/900 |
| 4,641,197 | 2/1987 | Miyagi | 358/280 |
| 4,646,077 | 2/1987 | Culley | 340/748 |
| 4,653,019 | 3/1987 | Hodge et al. | 364/900 |
| 4,661,812 | 4/1987 | Ikeda | 340/799 |
| 4,677,432 | 6/1987 | Maeda et al. | 340/728 |
| 4,688,032 | 8/1987 | Saito et al. | 340/799 |

*Primary Examiner*—Zache Raulfe B.
*Assistant Examiner*—Danh T. Phung
*Attorney, Agent, or Firm*—Antonelli, Terry & Wands

[57] ABSTRACT

A data processing apparatus for image display includes a character generator, a bit map type image memory, a CPU for accessing the character generator and the image memory to control the data stored in the image memory, a display, and a display controller for reading out the data stored in the image memory in accordance with a command from the CPU and supplying the read-out data to the display. The image display apparatus further includes an image memory controller having a barrel shifter for parallelly shifting the data supplied from the CPU by a designated number of bits, a mask controller for outputting a mask data to restrict a write range of the data supplied from the CPU and a write controller for operatively combining the data from the barrel shifter and the data read from the image memory in accordance with the mask data to prepare a write data and supplying the write data to the image memory.

20 Claims, 13 Drawing Sheets

IMAGE MEMORY ADDRESS CONFIGURATION

UPPER: CPU ADDRESS
LOWER: CRT ADDRESS

DISPLAY APPARATUS HAVING AN IMAGE MEMORY CONTROLLER UTILIZING A BARREL SHIFTER AND A MASK CONTROLLER PREPARING DATA TO BE WRITTEN INTO AN IMAGE MEMORY

BACKGROUND OF THE INVENTION

The present invention relates to an image display apparatus, and more particularly to a control circuit for an image memory which stores image information of a bit map type display.

In a prior art image display apparatus, a data in an image memory is partially modified in the following manner. When a character pattern is transferred from a character generator to the image memory, a microcomputer (MPU):

(1) temporarily fetches data stored at a corresponding address of the image memory, (2) shifts a pattern to be added, to a display bit position, (3) masks the data read from the image memory to extract a portion not to be modified, and masks the shifted character pattern to extract only the bits to be written, and logically ORes them, and (4) writes the logically ORed data into the same address of the image memory.

In the MPU, the bit processing speed is slow and a command to shift a plurality of bits is executed by repetitively executing a command of one-bit shift.

In Japanese Unexamined Patent Publication No. 59-90156, it has been proposed to modify the data bit by bit by an external circuit comprising a shift register and a counter rather than by the MPU. However, even in this system, there is a delay time between the end of the write operation by the MPU and the end of the operation of the shift register and the writing of the data into the image memory. Accordingly, the MPU cannot instruct continuous writing into the image memory. Therefore, it is suitable for writing one bit but is not appropriate for writing a large amount of data.

SUMMARY OF THE INVENTION

It is an object of the present invention to provide an image display apparatus which can perform transfer of an image data from a character generator to an image memory, shifting of the data and partial bit-by-bit writing, at a high speed for a large amount of data.

In order to achieve the above object, in accordance with the present invention, there are provided a barrel shifter for parallel shifting of data from a CPU, a mask controller for producing a mask data which limits a range of writing of the data supplied from the CPU, and a write controller for combining the data from the barrel shifter and a data fetched from an image memory in accordance with a mask data to prepare a write data and supplying it to the image memory.

DESCRIPTION OF THE PREFERRED EMBODIMENTS

Figure 1:
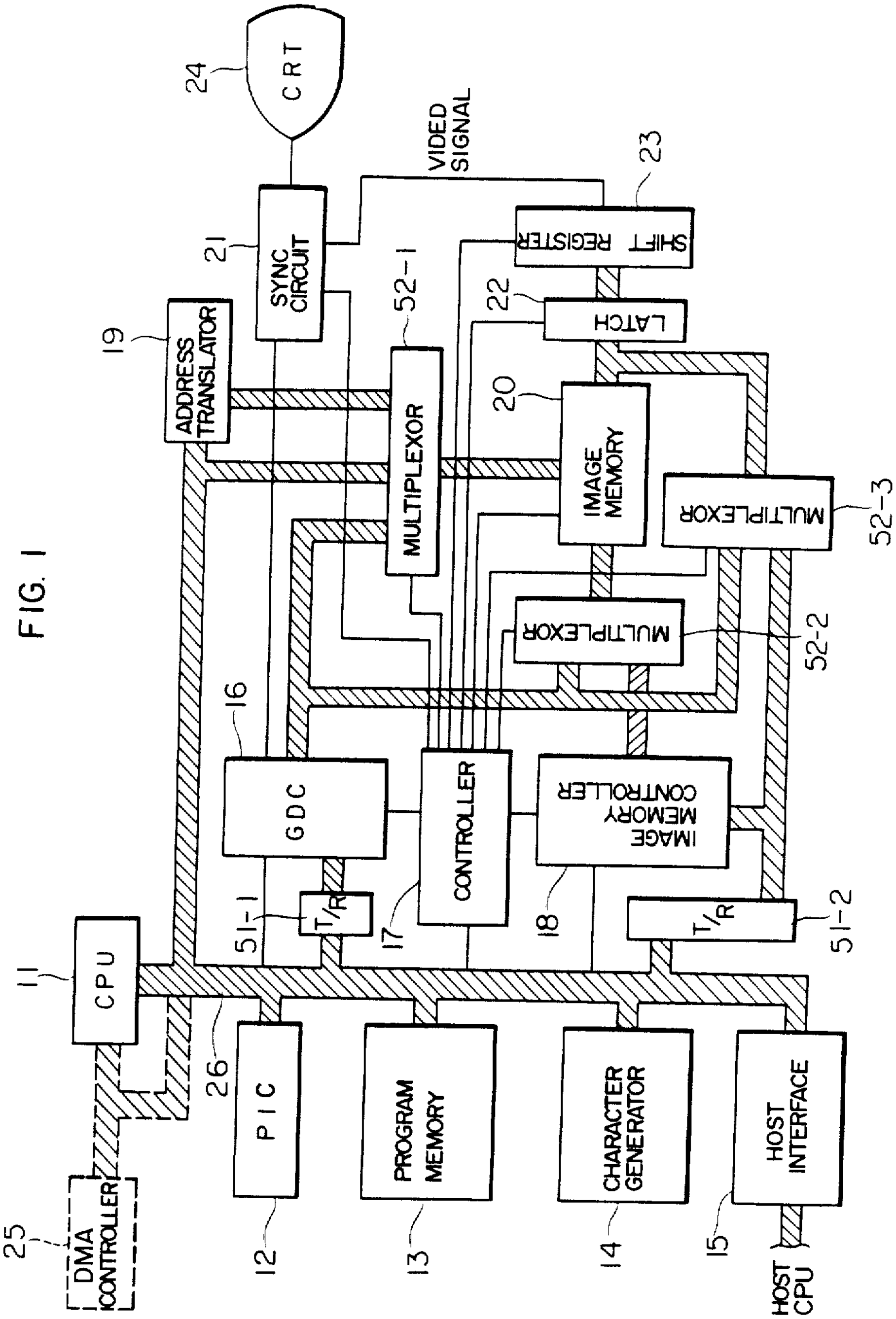
FIG. 1 is a block diagram of a typical embodiment of an image display apparatus of the present invention.

FIG. 1 shows a block diagram of a typical embodiment of an image display apparatus or a word processor of the present invention. Numeral 11 denotes a central processing unit (CPU) comprising an MPU for controlling a display function unit. It may be an Intel 8086 or 8088. Numeral 12 denotes an interrupt controller which supplies an interrupt signal to the CPU 11 in response to an external event to branch a program. Numeral 13 denotes a memory which stores a program to be executed by the CPU 11 and data to be processed. Numeral 14 denotes a character generator which stores patterns of Chinese characters, Kana and alphanumeric characters to be displayed, in dot matrices. It is usually a ROM. Numeral 15 denotes an interface circuit for receiving a command from a host CPU (not shown) which is at a higher level than the display function unit. Numeral 16 denotes a graphic display controller (GDC) which generates an address signal to sequentially read out a content of the image memory 20 and generates a synchronization signal for controlling a CRT monitor 24. It may be an NEC μPD 7220. Numeral 17 denotes a controller which generates a timing signal for the image memory 20 and a peripheral circuit. Numeral 18 denotes an image memory control circuit which supports a draw process by the CPU 11 in synchronism with a write signal to the image memory 20 supplied from the CPU 11. Numeral 19 denotes an address translator which rearranges an access address to the image memory 20. Numeral 20 denotes the image memory having memory elements corresponding to bits of the image in a bit map. It may be a dynamic RAM. Numeral 21 denotes a synchronization circuit which synchronizes horizontal and vertical synchronization signals of the GDC 16 with the image signal from the shift register 23 and supplies them to the CRT 24. Numeral 22 denotes a latch for temporarily storing the image data fetched from the image memory 20. Numeral 23 denotes a shift register for parallel-to-serial converting the image data prepared in the latch 22. Numeral 24 denotes the CRT monitor which receives the video signal and the synchronization signal from the synchronization circuit 21 and displays them. Numerals 51-1 and 51-2 denote tranceiver/receivers arranged between a CPU bus line 26, and the GDC 16 and the image memory controller 18 for buffering the signal. Numerals 52-1, 52-2 and 52-3 denote multiplexors which select sets of signals from input signal lines.

Figure 2:
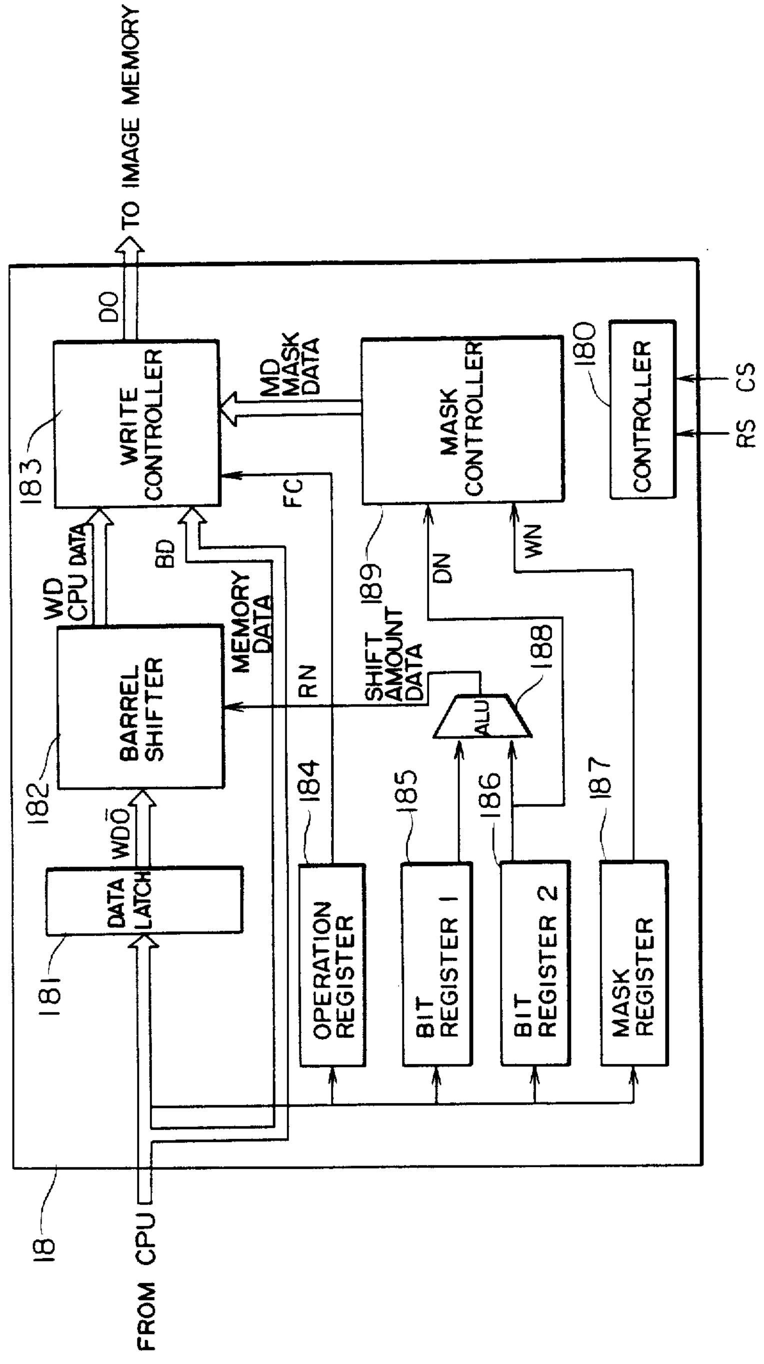
FIG. 2 is a block diagram of an image memory controller shown in FIG. 1.

The image memory controller 18 which shares an important function of the present apparatus is shown in detail in FIG. 2.

In FIG. 2, numeral 181 denotes a data latch which holds a data supplied from the CPU 11. Numeral 182 denotes a barrel shifter which shifts the data $WD\overline{O}$ read from the data latch 181 by the number of bits designated by an operation unit 188. Numeral 183 denotes a write controller which arranges a data WD supplied from the barrel shifter 182 and a data BD supplied from the image memory in accordance with an operation command FC from an operation register 184 and a mask data MD from a mask controller 189, and writes the arranged data DO into the image memory through the multiplexor 52-2. Numeral 184 denotes the operation register which holds an operation command of the image data supplied from the CPU and supplies it to the write controller 183. The operation command FC indicates a command to logically process the two image data WD and BD. Numeral 185 denotes a bit register which receives from the CPU a designation $S_1$ for the shift of the source data of the image data and holds it. Numeral 186 denotes a bit register which holds a designation $S_2$ for the shift of the data WD for the image data BD to the display bit position in the image memory. Numeral 188 denotes an arithmetic logic unit (ALU) which calculates the shift amount $S_1-S_2$ of the barrel shifter 182 in accordance with the bit shift amounts held in the bit registers 185 and 186 and supplies a shift amount data RN to the barrel shifter. Numeral 187 denotes a mask register which holds a data having a bit width corresponding to write processing and supplies it to a mask controller 189. Numeral 189 denotes the mask controller which produces a mask data to mask writing of the write data WD supplied from the CPU 11 into the image memory 20 in accordance with the bit width held in the mask register 187 and the shift amount held in the bit register 186. Numeral 180 denotes a controller. When a chip of the image memory controller 18 is selected by a chip select signal CS from the CPU 11, the corresponding register is selected by a register select signal RS from the CPU and the data from the CPU is written thereinto.

The configurations and functions of the barrel shifter, mask controller and write controller are explained with reference to FIGS. 3 to 6.

Figure 3:
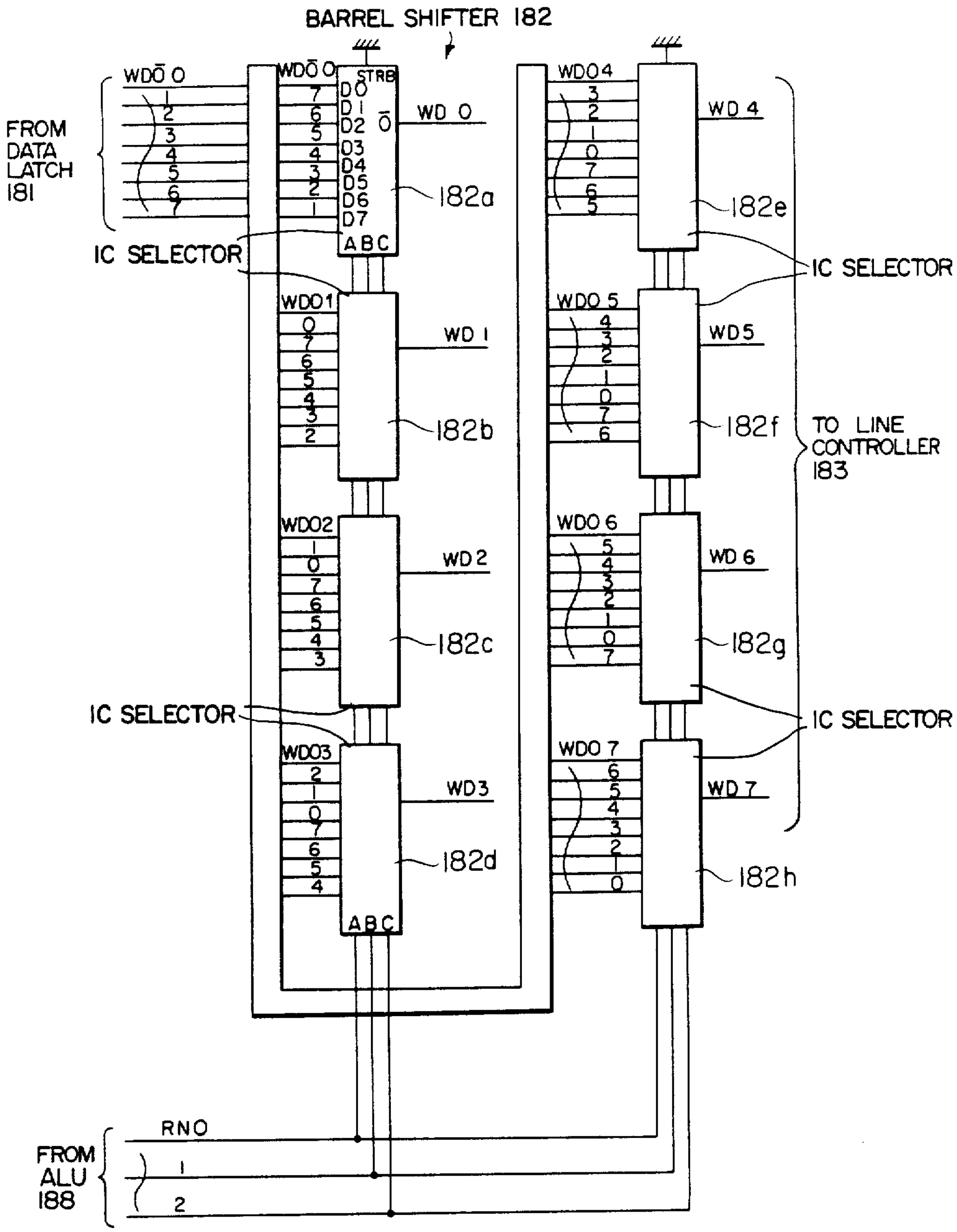
FIG. 3 shows a circuit diagram of a barrel shifter in the image memory controller.

FIG. 3 shows an embodiment of the barrel register 182. It comprises eight IC selectors 182*a*–182*h* such as Texas Instruments SN74LS151. Parallel outputs $WD\overline{O}7-0$ from the data latch 181 are supplied to the selectors each of which selects one of the inputs $WD\overline{O}7-WD\overline{O}0$ in accordance with shift amount data RN2−0 from the ALU 188. If the shift amount data RN2−0 are "101", the selectors select the sixth input. That is, the selector 182*a* selects the input DB03, the selector 182*b* selects the input DB04, and so on, and the selector 182*h* selects the input DB02. Accordingly, the output WD0-WD7 of the barrel shifter 182 is shifted to the right by five bits relative to the input $WD\overline{O}0$-$W\text{-}D\overline{O}7$. In this manner, the barrel shifter 182 shifts the input data by the number of bits designated by the shift amount data.

Figure 4:
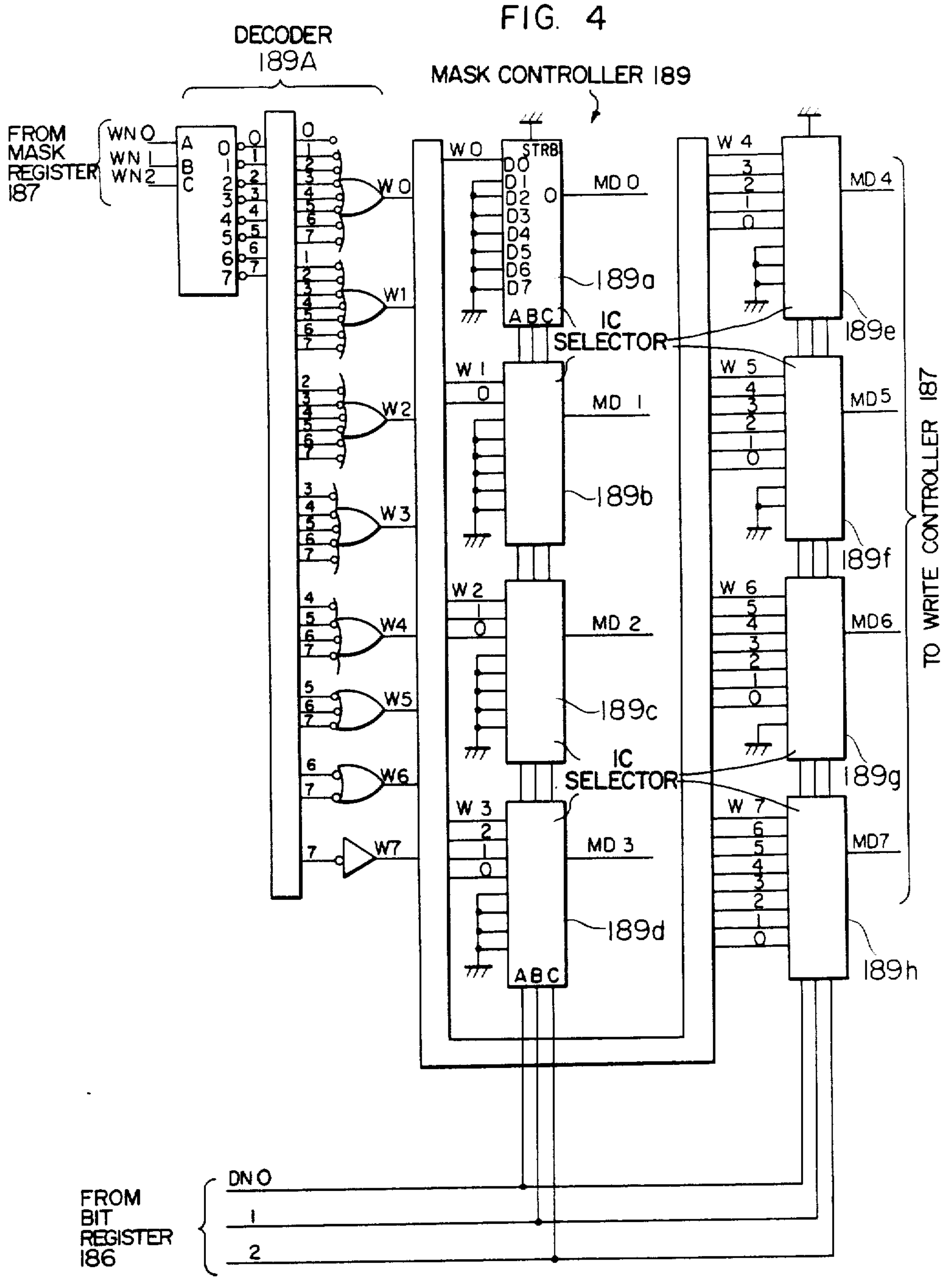
FIG. 4 shows a circuit diagram of a mask controller shown in FIG. 2.

FIG. 4 shows an embodiment of the mask controller 189. Numeral 189A denotes a decoder which decodes a 3-bit signal WN2−0 which designates a mask bit width from the mask register 187, and numerals 189*a*–189*h* denote IC selectors which shift the output signals W7−0 of the decoder in accordance with the signals DN2−0 which designate the shift amount from the bit register 186. The IC decoder is preferably a Texas Instruments SN 74LS138 and the IC selectors are preferably a Texas Instruments SN 74LS151. The decoder 189A produces the signal W0-W7 designating the mask bit width in accordance with the signal W2−0. For example, when the signal WN2−0 is "000", only W0 is "1" and all other signals are "0" which indicates that the mask bit width is 1, and when the signal WN2−0 is "001", only W0 and W1 are "1" and all other signals are "0" indicating that the mask bit width is 2, when the signal WN2−0 is "010", only W0, W1 and W2 are "1" and all other signals are "0", and when the signal WN2−0 is "111", all of W0−W7 are "1" indicating that the mask bit width is 8. The selectors selects the input signals in accordance with the data DN2−0. When the data DN2−0 are "000", that is, when the shift amount is 0, the selectors 189*a*–189*h* select the input terminals D0 to select the signals W0, W1, W2, . . . W7, and when the data DN2−0 are "001", that is, when the shift amount is 1, the selectors 189*a*–189*h* select the input terminals D1 to select the signals 0, W0, W1, . . . W6. Thus, the outputs MD0−MD7 of the selectors 189*a*–189*h* shift the outputs W0−W7 of the decoder in accordance with the data DN2−0.

Figure 5:
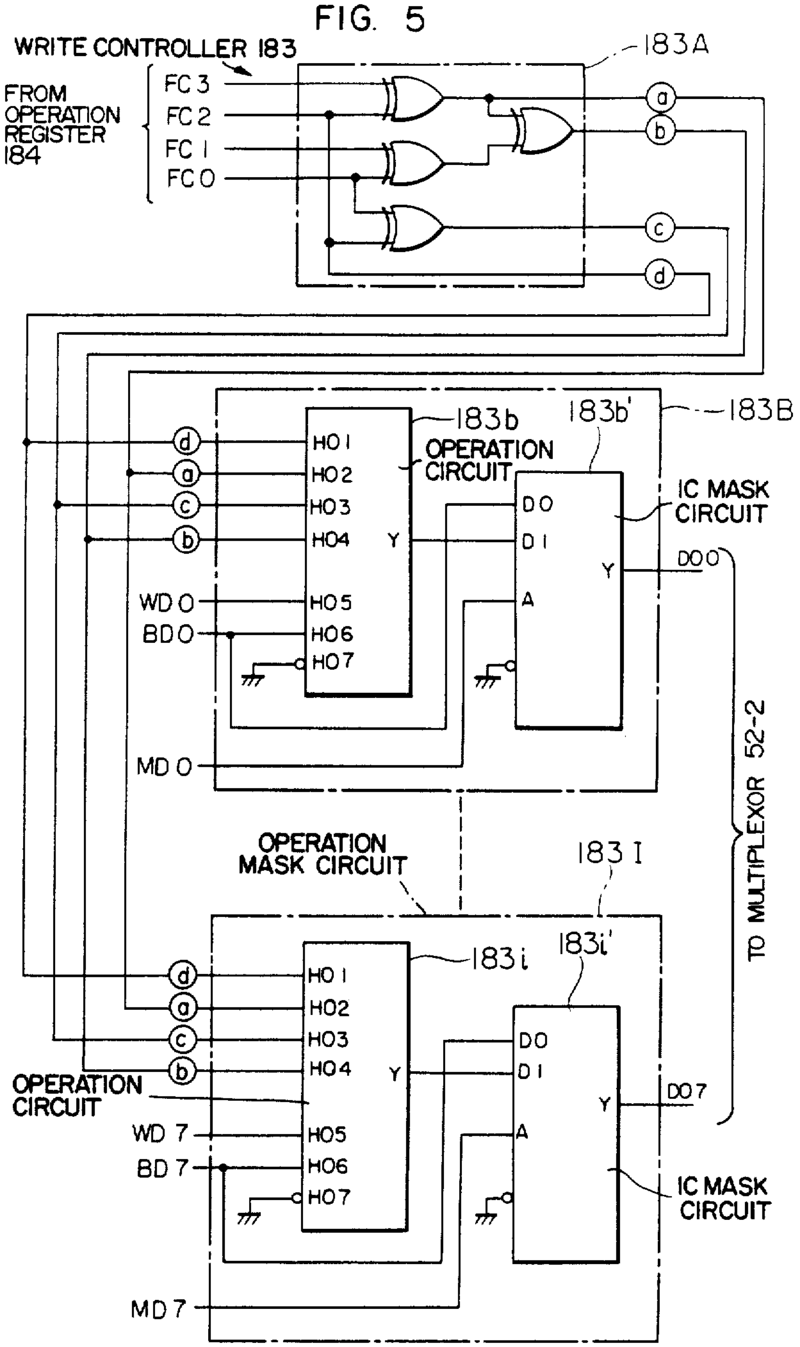
FIG. 5 shows a circuit diagram of a write controller shown in FIG. 2, FIGS. 6(*a*)–6(*c*) illustrate an operation of the image memory controller.

FIG. 5 shows an embodiment of the write controller 183. It comprises a function decoder 183A which produces a decoder signal a, b, c or d in accordance with the operation commands FC3−0 from the operation register 184 and an operation mask unit having eight operation mask circuits 183B–183I. The operation mask circuits comprises operation circuits 183*b*–183*i* and IC mask circuits 183*b*'–183*i*'. The IC operation circuits and the IC mask circuits are preferably Texas Instruments SN 74LS153 and SN 74LS157, respectively. The function decoder 183A produces the decoder signal a, b, c or d in accordance with the operation command FC3−0 and supplies it to the operation circuits 183*b*–183*i* of the operation mask circuits. The corresponding bit data WD from the barrel register 182 and the corresponding data BD from the image memory are supplied to the operation circuits 183*b*–183*i* of the operation mask circuits, which logically operate the data WD and BD in accordance with the decoded signals a - d.

Table 1 below shows a logical function corresponding to the operation command FC3−0. When the data FC3−0 is "0000", the output Y is "0", when FC3−0 is "0001", the data BD is outputted as it is, and when FC3−0 is "0010", the logical AND of the data BD and WD is outputted.

TABLE 1

| FC3 | FC2 | FC1 | FC0 | DV | Remark |
|---|---|---|---|---|---|
| 0 | 0 | 0 | 0 | 0 | ZERO |
| 0 | 0 | 0 | 1 | BD | KEEP |
| 0 | 0 | 1 | 0 | $WD \cdot BD$ | AND |
| 0 | 0 | 1 | 1 | $\overline{WD} \cdot BD$ | AND 1 |
| 0 | 1 | 0 | 0 | 1 | ONE |
| 0 | 1 | 0 | 1 | $\overline{BD}$ | NOT |
| 0 | 1 | 1 | 0 | $\overline{WD} + \overline{BD}$ | OR 3 |
| 0 | 1 | 1 | 1 | $WD + \overline{BD}$ | OR 2 |
| 1 | 0 | 0 | 0 | WD | PASS |
| 1 | 0 | 0 | 1 | $WD \oplus BD$ | EOR |
| 1 | 0 | 1 | 0 | $WD \cdot \overline{BD}$ | AND 2 |

TABLE 1-continued

| FC3 | FC2 | FC1 | FC0 | DV | Remark |
|---|---|---|---|---|---|
| 1 | 0 | 1 | 1 | WD + BD | OR |
| 1 | 1 | 0 | 0 | $\overline{WD}$ | NOT 1 |
| 1 | 1 | 0 | 1 | $\overline{WD \oplus BD}$ | ENOR |
| 1 | 1 | 1 | 0 | $\overline{WD}$ + BD | OR 1 |
| 1 | 1 | 1 | 1 | $\overline{WD}$ · BD | AND 3 |

The mask circuits 183*b*'-183*i*' of the operation mask circuits receives the corresponding bit data BD from the image memory, the Y outputs of the corresponding operation circuits 183*b*-183*i*, and the corresponding mask data MD from the mask controller 189. When the mask data MD is "0", the mask circuits mask the Y outputs from the operation circuits, that is, they update data and select the input D0 to output the data DB at the Y outputs. Thus, the data of the image memory is not updated and the original data BD is stored in the image memory. On the other hand, when the mask data MD is "1", the mask circuits mask the data BD and select the input D1 to output the Y outputs of the operation circuits. A new data is written into the image memory so that the data is updated.

Figure 6A:
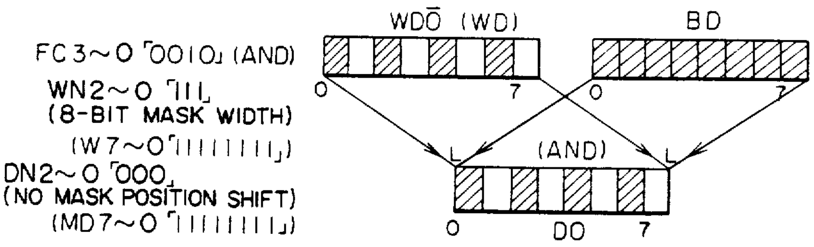
Figure 6B:
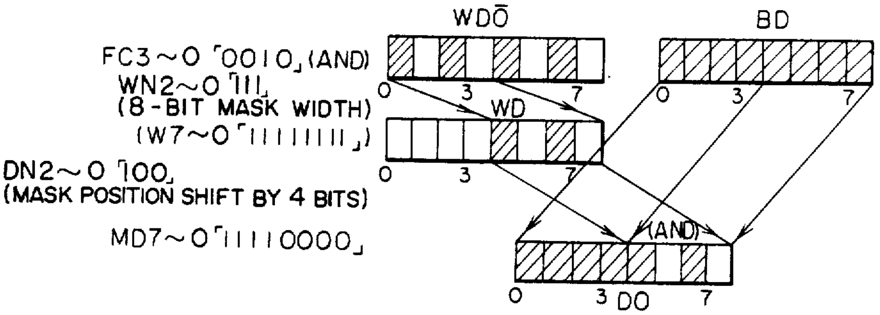
Figure 6C:
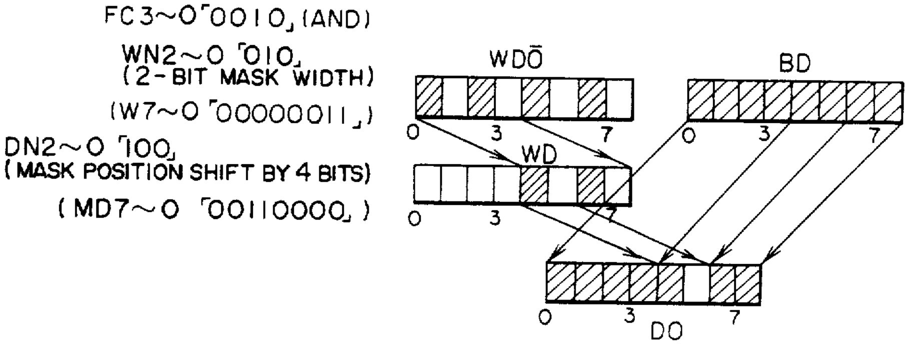

FIG. 6 illustrates processing of the data BD and WD in the write controller 183. The data BD and WD are of 8-bit length and hatched areas are "1" (bright points) and blank areas are "0" (dark points). FIG. 6(*a*) shows a relationship between the input data WD and BD, and the output data D0 where the operation command data FC3−0 is "0010" (the operation circuit ANDs the data BD and WD), the data WN2−0 indicating the mask width to the mask controller 189 is "111" (8-bit mask width), and shift amount data DN2−0 for the mask bit positions is "000" (zero shift amount). In this case, the mask data MD7−0 is "11111111" and the output D0 of the mask circuits are the Y outputs of the corresponding operation circuits, that is, the AND functions of the corresponding bits of the data WD7−0 and BD7−0. The output D07−0 is replaced by the new data.

In FIG. 6(*b*), FC3−0 is "0010", WN2−0 is "111" and DN2−0 is "100" (4-bit shift of the mask bit position). In this case, the mask data MD7−0 is "11110000", and the low order four bits of the output D07−0 are not updated but they are low order four bits BD3−0 of the data BD, and the high order four bits are AND function of the high order four bits WD7−4 of the data WD and the high order four bits BD7−4 of the data BD. The high order four bits WD7−4 of the data WD correspond to the low order four bits WD03−0 of the input to the barrel shifter.

In FIG. 6(*c*), FC3−0 is "0010", WN2−0 is "010" (2-bit mask width) and DN2−0 is "100" (4-bit shift). In this case, the mask data MD7−0 is "00110000". The low order four bits DO3−0 of the output DO7−0 and the high order two bits DO7−6 are not updated but they are the low order four bits BD3−0 and the high order two bits BD7−6 of the data BD, and the output DO5−4 is the logical AND of the data WD5−4 and the data BD5−4. The data WD5−4 corresponds to the two bits WDO1−0 of the input to the barrel shifter.

In FIGS. 6(*a*), 6(*b*) and 6(*c*), the data shift amount from the bit register 185 is zero, and the data shift amount RN from the ALU 188 and the shift amount DN from the bit register 186 are equal.

Referring to FIG. 2, the operation mode of the image memory 20 is explained. When the CPU 11 writes a data into the image memory 20, the image memory 20 operates in a read modify write mode. The data from the CPU 11 is temporarily stored in the data latch 181 and processed by the barrel shifter 182 and then supplied to one input terminal of the write controller 183. The image data at the designated address of the image memory 20 is read out and supplied to the other input terminal of the write controller 183. Those two data inputs are logically operated bit by bit by the write controller 183 in accordance with the instruction stored in the operation register 184, and the operation result is written into the designated address of the image memory 20.

The address configuration of the image memory 20 is now explained.

The video signal comprises a series of image dots, raster by raster. For refreshing the image, the GDC 16 fetches data from the image memory and delivers to the shift register 23 through the latch 22. The shift register 23 sequentially converts the data to a serial data starting from the LSB, and delivers the converted data as a video signal. The LSB is followed by the MSB of the next data sequentially read out from the image memory.

Figure 7:
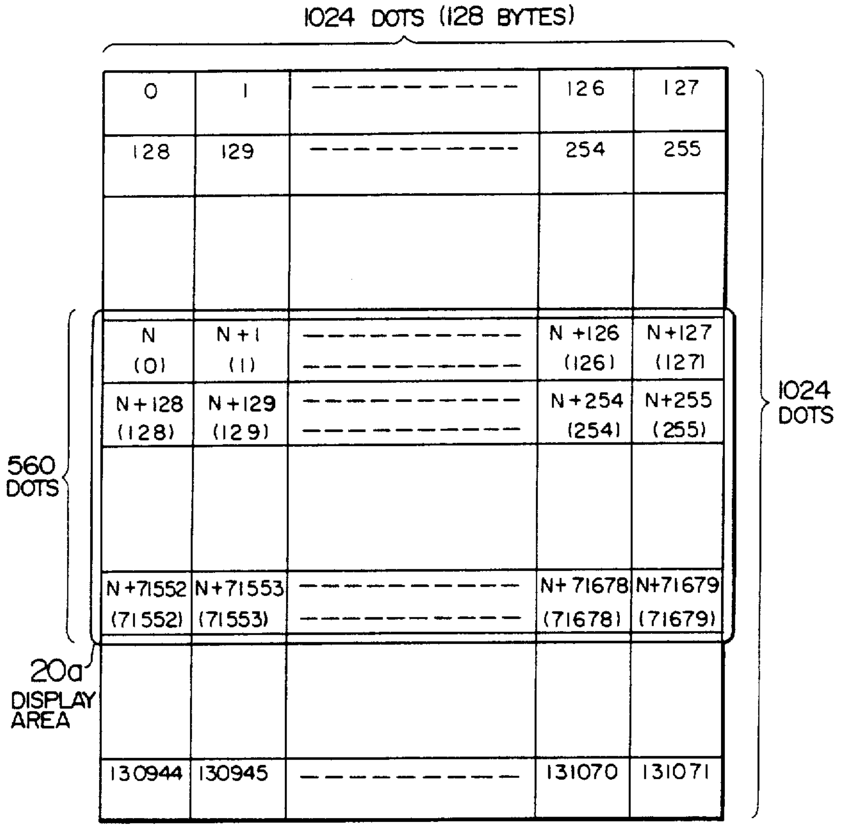
FIG. 7 (PRIOR ART)
FIG. 7 shows an address configuration of a prior art image memory.

FIG. 7 shows an address configuration of a prior art image memory. An area 20*a* corresponds to a CRT screen display area.

When the CPU 11 handles the 24×24-bit character pattern, it is of 3-byte depth in the raster scan direction and of 24-byte depth in the raster sequence. The Intel 8086 or 8088 which is used as the CPU 11 is provided with a string instruction for repetitive processing of the sequential addresses. By using the string operation, the designated words or bytes of the data in the designated source address can be transferred to the destination address with a minimum number of steps and in a minimum processing time. In order to attain a maximum effect, it is effective to transfer a large number of bytes in one transfer cycle. From this standpoint, the addresses of the image memory 20 looked from the CPU 11 should be in the order of the raster sequence. On the other hand, when the same operation is to be repeated for a large area including continuous rasters such as clearing of the entire screen, the frequency of switching of the process can be reduced if the addresses are arranged in the raster scan direction. It is desirable for various processings that both methods can be selectively used. In the present embodiment, the address arrangement is switched by the address translator 19. The address translator is described in the U.S. patent application Ser. No. 750,781 which was assigned to the assignee of the present application.

Figure 8:
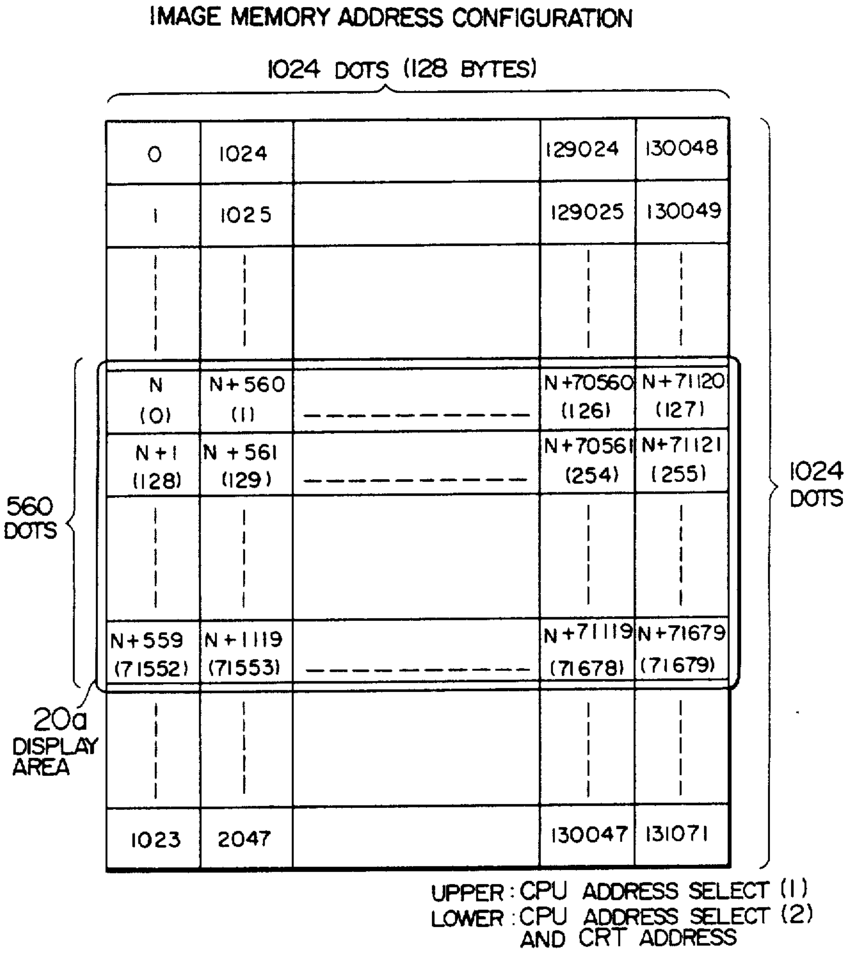
FIG. 8 shows an address configuration of the image memory of the present invention.

FIG. 8 shows an address configuration of the image memory in the present embodiment. A relationship between the CPU address at the input of the multiplexor 52-1 and the CRT address at the output is shown in Table 2. The address translator 19 switches the address lines in accordance with the relationship between the CPU address selection (1) and the CPU address selection (2) shown in FIG. 9.

TABLE 2

| CRT Display Address (GDC) | CPU Address Selection (1) | CPU Address Selection (2) | Memory Address |
|---|---|---|---|
| CA0 | A10 | A0 | SWITCH BANK |
| CA1 | A11 | A1 | CA0 |
| CA2 | A12 | A2 | RA0 |
| CA3 | A13 | A3 | RA1 |
| CA4 | A14 | A4 | RA2 |

TABLE 2-continued

| CRT Display Address (GDC) | CPU Address Selection (1) | CPU Address Selection (2) | Memory Address |
|---|---|---|---|
| CA5 | A15 | A5 | RA3 |
| CA6 | A16 | A6 | RA4 |
| CA7 | A0 | A7 | CA1 |
| CA8 | A1 | A8 | RA5 |
| CA9 | A2 | A9 | RA6 |
| CA10 | A3 | A10 | RA7 |
| CA11 | A4 | A11 | CA2 |
| CA12 | A5 | A12 | CA3 |
| CA13 | A6 | A13 | CA4 |
| CA14 | A7 | A14 | CA5 |
| CA15 | A8 | A15 | CA6 |
| CA16 | A9 | A16 | CA7 |

The SWITCH BANK in the memory address is an 8-bit selection signal in a 16-bit DRAM, RA0–RA7 represent RAS addresses of the DRAM, and CA0–CA7 represent CAS addresses.

Figure 9:
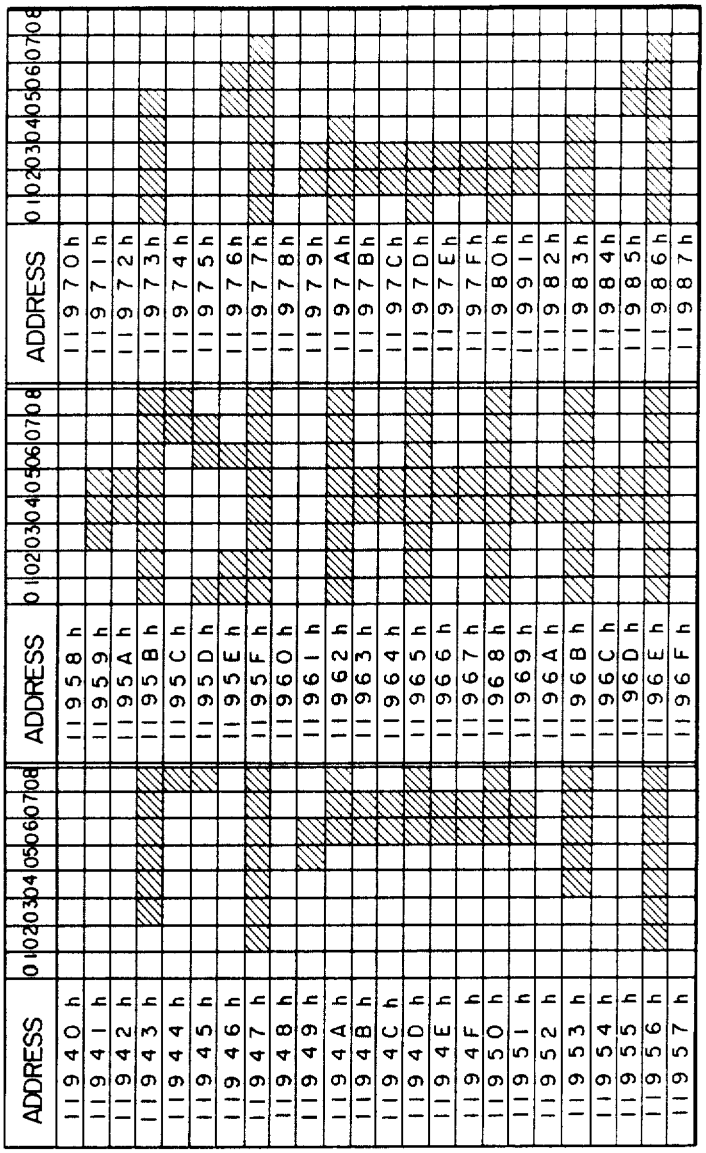
FIG. 9 shows a character pattern stored in a character generator.

In the present embodiment, the character generator 14 contains dot matrix data of the character patterns stored word by word, byte by byte in this embodiment, in sequence in a scan line arrangement direction, as shown in FIG. 9. A pattern for one character comprises 72 bytes, that is, left 24 bytes, middle 24 bytes and right 24 bytes. FIG. 9 shows the pattern for a Chinese character " " having a character number Obb8 in hexadecimal.

The operation is now explained. The CPU 11 performs the display operation in accordance with the program stored in the program memory 13. The CPU 11 receives an instruction on the display operation from an external host CPU (not shown) through the host interface 15 and writes a data pattern of the image into the image memory 20. The content of the image memory 20 is sequentially read out by the GDC 16 and supplied to the CRT monitor 24 as the video signal through the latch 22, shift register 23 and synchronization circuit 21. The CRT monitor 24 displays the data on the screen.

Figure 10:
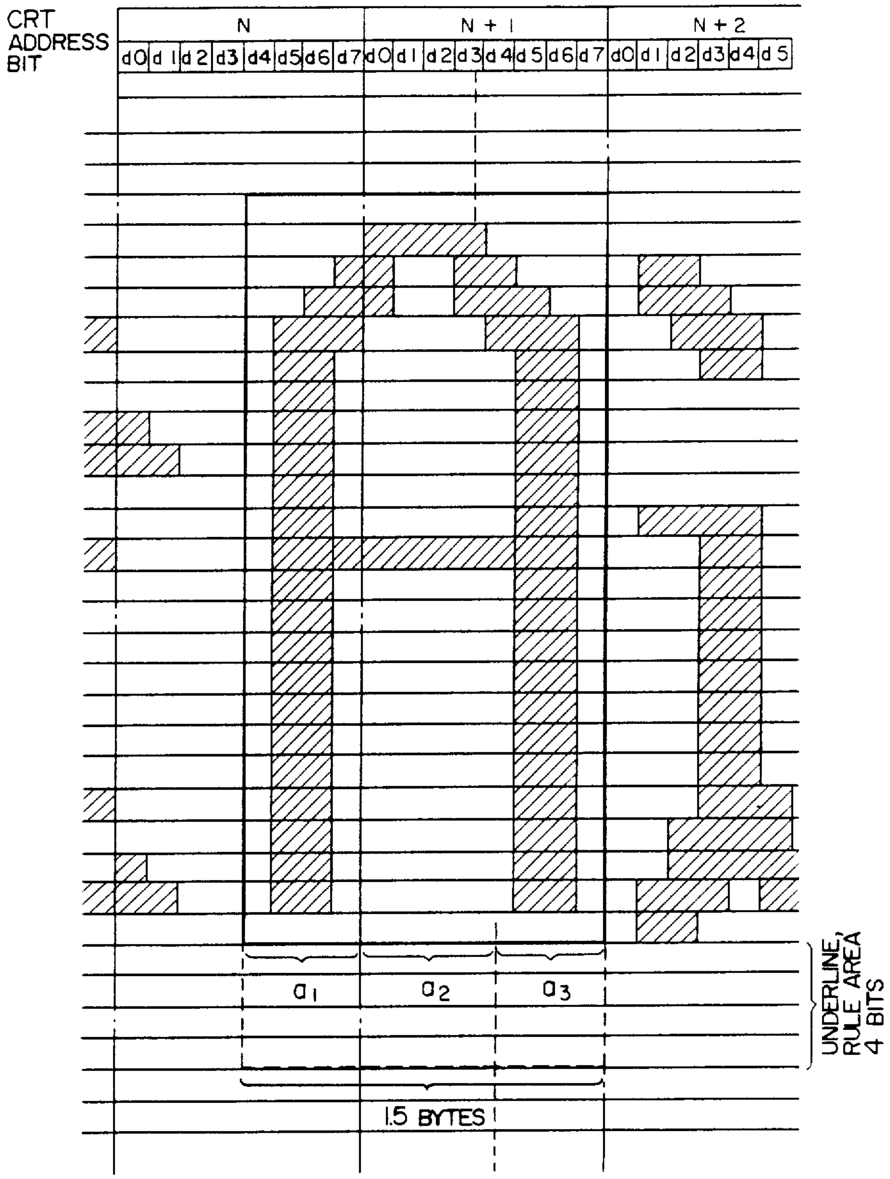
FIG. 10 shows a data in the image memory.

The area of the bit map image memory 20 occupied by the character pattern of one Chinese character is 24 (horizontal)×28 (vertical) bits for a regular width character, and 12×28 bits for a half-width character as shown in FIG. 10. In the vertical direction, 24 bits are assigned to the character pattern area and 4 bits are assigned to a line-to-line space, underline or rule area. A vertical rule is overlayed in the 24-dot area of the character pattern. The write operation of the image data into the image memory 20 and the display operation of the content of the image memory 20 on the CRT monitor 24 are now explained.

(1) Processing by the CPU (Preparation of image)

The image is displayed by writing "1" (bright point) or "0" (dark point) into the image memory 20 bit by bit. The character is displayed on the screen by writing the character pattern designated by the character generator 14 into the byte address on the image memory 20 by using the string operation.

The bit positions of the character pattern of the character generator 14 are arranged byte by byte as shown in FIG. 9. Since the half-width character has the horizontal width of 1.5 bytes, if one or more half-width character is included in a sentence, the bit position of the character pattern is shifted by 4 bits in the byte in the image memory 20 as shown in FIG. 10 and the characters are not aligned. Where the image memory controller 18 is not provided, the bit shift is required for each one-byte transfer of the character pattern from the character generator 14 to the image memory 20. In the 8086 or 8088 CPU 11, the memory shift by the string operation which is powerful to the byte transfer cannot be utilized.

In the present embodiment, the image memory controller 18 shown in FIG. 2 is provided so that the bit shift is carried out by the barrel shifter 182 in place of the CPU 11. Since the barrel shifter 182 rotates the byte data, the data which is to be shifted and written into the next address is masked by the mask controller 189 bit by bit so that writing is inhibited. When the bit shift is required, the address of the image memory 20 is switched since the data has been shifted out to the next byte sequence, and the masked data in the same character pattern is transferred to the image memory 20.

The operation of the present embodiment is now explained. The area of the bit map image memory 20 occupied by one Chinese character is 24 (horizontal)×28 (vertical) bits for the regular width character, and 12×28 bits for the half-width character. In the vertical direction, 24 bits are assigned to the character pattern and 4 bits are assigned to the line-to-line space, underline or rule area. The vertical rule is overlayed on the 24-bit area of the character pattern.

When the instruction on the image display is supplied to the program memory 13 from the host CPU through the host interface 15, the processing program of the CPU 11 is started and the CPU 11 controls the image display and writes the data. One line of display data is prepared in the information area of the memory 13 by the host CPU and the data write command is issued. The program which is stored in the memory 13 and which controls the CRT display circuit is started, and since the write command is in the information area of the memory 13, the CPU 13 executes the program shown by a flow chart of FIG. 11.

Figure 11:
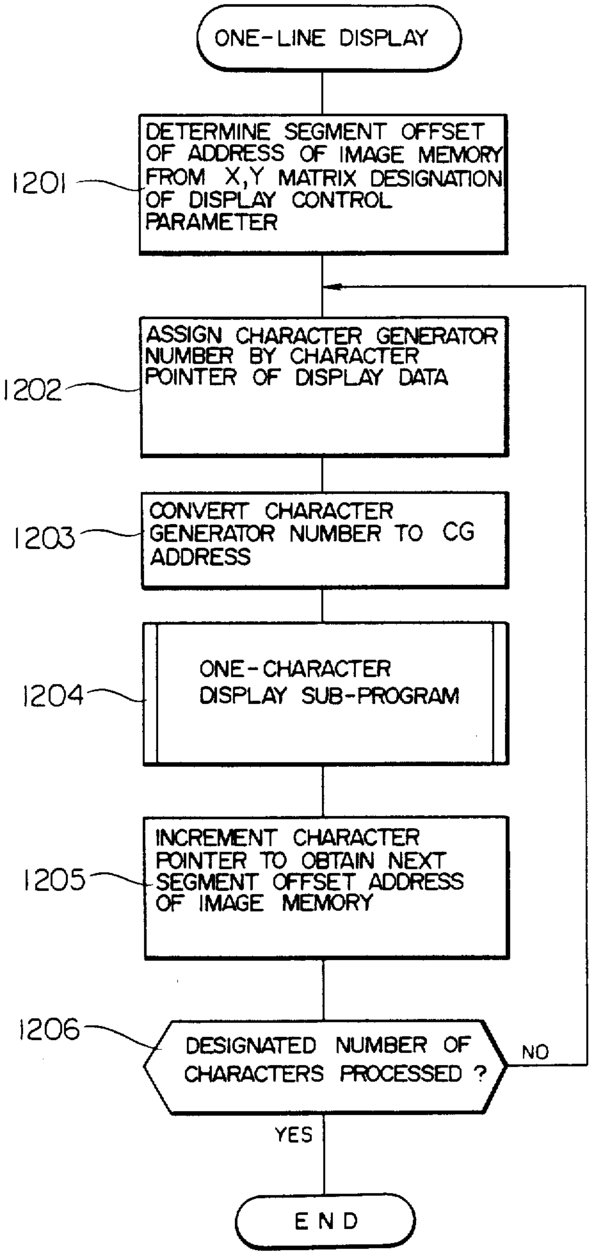
FIG. 11 is a flow chart showing a character writing process in the image display apparatus of the present invention.

FIG. 11 shows the flow of the write processing in the present embodiment.

In a step 1201, a matrix (X, Y) indicating a start point of one line to be displayed is obtained from display control parameters associated with the display data in the information area of the memory 13, and the corresponding address in the image memory 20 is calculated. In a step 1202, one character is extracted from the character data of the display data in accordance with a pointer indicating the character to be displayed and a character generator number is obtained. In a step 1203, the character generator number is converted to an address of the character generator 14. In a one-character display sub-program step 1204 (FIG. 12), one character of character pattern is written into the image memory by using the address of the image memory 20 and the address of the character generator 14 as arguments. At the end of the one-character display, a step 1205 is executed in which the character pointer which points the position of the character data to be displayed is advanced by one. In a step 1206, whether the designated number of display character designated by the display control parameter associated with the display data in the information area of the image memory 20, have been displayed or not, and if they have not, the process returns to the step 1202 to display the next character, and if they have, the process is terminated.

Figure 12:
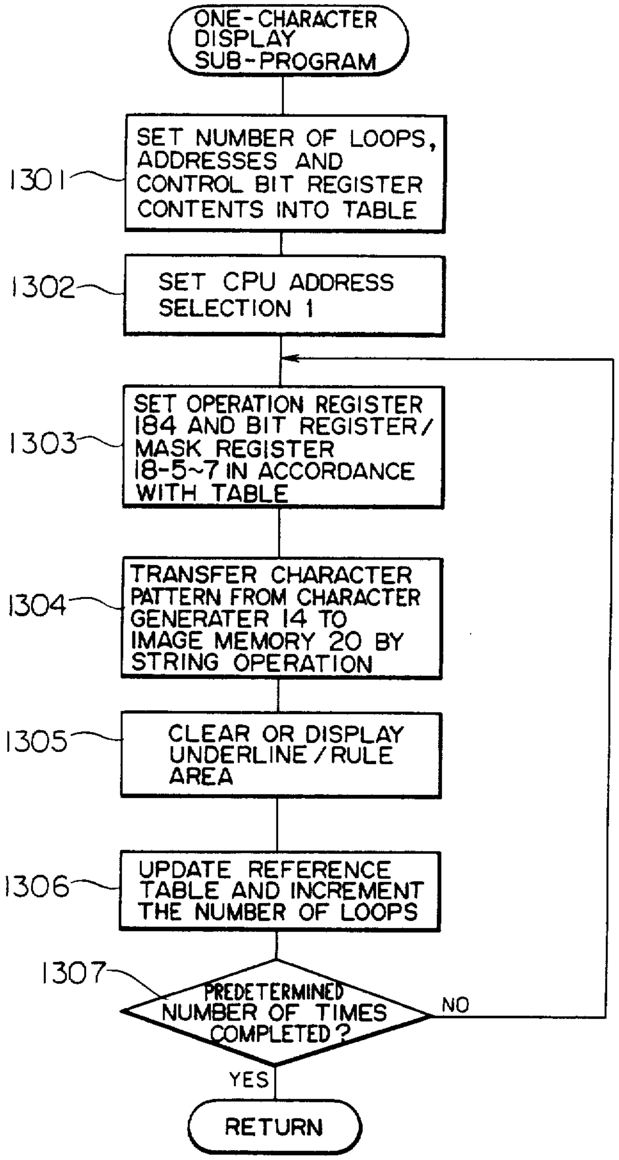
FIG. 12 is a flow chart for a one-character display sub-program.

FIG. 12 shows a flow chart of a detail of the one-character display sub-program 1204 shown in the flow chart of FIG. 11.

In a step 1301 of this flow, since the number of transfer bytes of the character pattern is different between the half-width character and the regular width character, the number of times of looping, the address in the character generator 14 at which the character pattern is contained, the address of the image memory 20 corresponding to the area to be displayed, and the contents to be sets into the registers 184–187 in the image memory controller 18 are set in a table of the program memory 13. In a step 1302, the arrangement of the access addresses of the image memory is set to the CPU address selection 1 in the raster sequence. In a step 1303, the content of the table is read out and written into the registers 184–187 of the image memory controller 18. In a step 1304, the character pattern is transferred from the character generater 14 to the predetermined address of the image memory 20 by the string operation. In a step 1305, the underline or rule is drawn. In a step 1306, the table is updated to increment the number of times of looping in a loop number counter of the program memory 13 by one. In a step 1307, whether the number of times of looping in the loop number counter has completed the predetermined number or not is checked, and if they have, the process is terminated.

Figure 13:
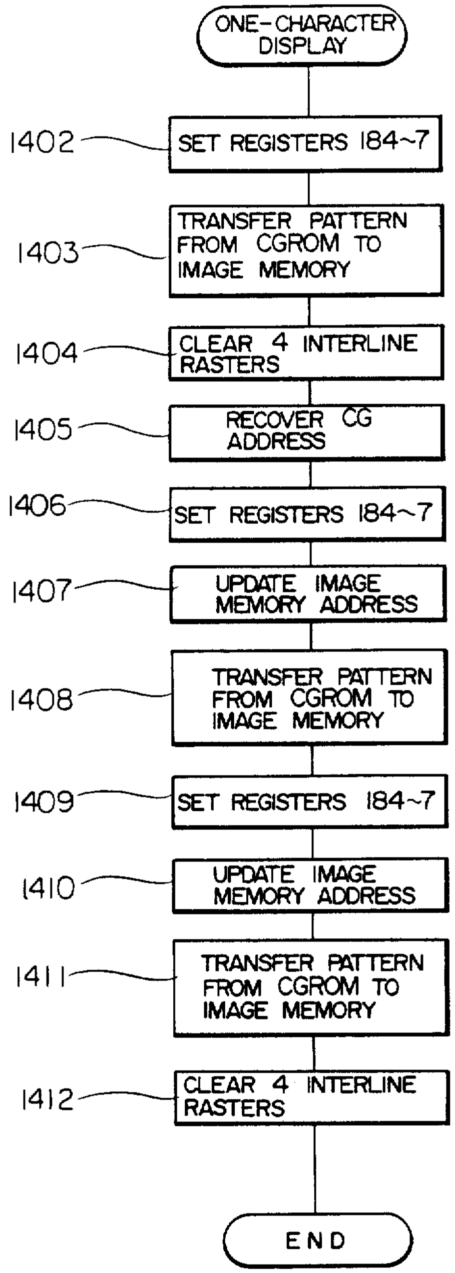
FIG. 13 is a flow chart for a one-character display process in the image display apparatus of the present invention.

FIG. 13 shows a flow of write process in the present embodiment, in which a half-width character pattern A shown in FIG. 10 is drawn. When the half-width character pattern A is transferred from the character generator 14 to the address of the image memory 20 shown in FIG. 10, the pattern A is divided into three regions $a_1$, $a_2$ and $a_3$ each comprising of 24×4 bits. That is, the number of loops is set to three. The regions $a_1$ and $a_2$ of the half-width character A shown in FIG. 10 are stored at the addresses **11940*h*–11957*h* of the character generator of FIG. 9 and the region $a_3$ is stored in the low order four bits $O_1$–$O_4$ at the addresses 11958*h*–1196F*h*. In order to draw the first region $a_1$, the regions $a_1$ and $a_2$ are read from the character generator and only the region $a_1$ is drawn. In a step 1402, the FC3−0 "1000" is set in the operation register 184 (to pass and write to the operation circuit of the write controller the image data WD), "000" is set in the bit register 185, the DN2−0 "100" (to shift the mask bit position by four bits) is set in the bit register 186, and the WN2−0 "100" (4-bit mask width) is set in the mask register 187. In a step 1403, the 24-byte character pattern data is transferred to the image memory from the character generator 14 through the image memory controller 18. Accordingly, the 24×4-bit pattern (region $a_1$ in FIG. 10) is drawn in the high order four bits at the address N of the image memory. The original data BD of the image memory is written into the low order four bits at the address N. In a step 1404, the interline area is cleared and the four-bit region $a_2$ is drawn. In a step 1405, the CG address is recovered, and in a step 1406, the data in the registers 185–187 are updated. "100" (4-bit shift) is set in the bit register 185, "000" (zero shift) is set in the bit register 186 and "100" is set in the mask register 187. In a step 1407, the image memory address is updated. In a step 1408, the 24×4-bit region $a_2$ is drawn into the low order four bits at the address N−1 of the image memory. Finally, in steps 1409–1412, the registers are set in the same manner as the steps 1402 and 1403, the character pattern is read from the character generator 14**, and the region $a_3$ at the left four bits thereof is drawn.

When the regular width character is drawn, the number of loops is set to 6 since an area of 24×4-bits is drawn six-times. When the graphic information such as rule is to be drawn, the prior art system requires a large number of steps for the bit-by-bit drawing of the vertical rule. In the present embodiment, the bit width of the rule is set in the mask register 187, and the image data originally displayed and the "1" rule data are ORed by the image memory controller by the string command of the CPU 11 so that the rule can be drawn with a high speed processing.

(2) Refreshing (Image display)

The GDC 16 generates the read signal to the image memory 20 in response to the synchronization timing of the CRT monitor 24. The GDC 16 generates the addresses in the order of the display positions and supplies the read signal to the image memory 20 through the controller 17. The data read from the image memory 20 at the read time of the CRT monitor is supplied to the shift register 23 through the latch 22 and parallel-to-serial converted by the video clock, and then supplied to the CRT monitor 24 as the video signal.

In the above embodiment, the CPU 11 is the Intel 8086 or 8088 and the string operation is used effectively. Similar effect may be attained in the DMA transfer between the memories. In this case, a DMA controller 25 is connected to the CPU 11 and the data bus 26 as shown by broken lines in FIG. 1. The DMA controller 25 responds to the data transfer command from the CPU 11 to transfer the data between the memories in place of the CPU 11. The CPU 11 sets a command for the memory access into the DMA controller and designates the access address range, and the DMA controller responds thereto to transfer the data between the character generator and the image memory.

A separate CPU may be provided so that the separate CPU carries out the data transfer between the memories.

The byte-by-byte vertical arrangement of the image memory addresses has been illustrated. In a 16-bit CPU, the processing speed is faster if the data is processed 16 bits at a time. The 16-bit vertical arrangement is also within the scope of the present invention.

In accordance with the present invention, the character pattern is written into any address of the image memory and displayed at any position on the display screen, with a high speed and a flexibility of the CPU. When the graphic pattern is to be drawn, it can be written into the memory bit by bit at a high speed.

This leads to the reduction of the display processing time in the display apparatus with the MPU and the improvement of the operability.

We claim as our invention:

1. An image display apparatus comprising:

bit map type image memory means for storing image data;

a character generator, coupled to a CPU bus line, including a memory having dot matrix data of character patterns stored word by word in sequence in a scan line arrangement direction;

a CPU for accessing said character generator and said image memory, via said CPU bus line, to control the data stored in said image memory;

a display;

display controller means, coupled to said CPU via said bus line and to said image memory means, for reading out the data stored in said image memory means in response to a command from said CPU and transmitting said data to said display;

address translation means for translating an image memory access address sequence transmitted from said CPU, via said bus line, to an access address sequence in a scan line direction when the image memory access address sequence is in a scan line arrangement direction;

an address selection means for selectively transmitting to said image memory means an access address from said display controller means, the access address from said CPU and the translated access address from said CPU via said address translation means;

a barrel shifter, coupled to said CPU bus line, for parallelly shifting data delivered from said CPU by a designated number of bits at a time;

a mask controller, coupled to said CPU bus line, for producing a mask data for limiting a write range of the data delivered from said CPU; and a write controller, coupled to said barrel shifter, said mask controller and to said image memory means, for combining data received from said barrel shifter with the data read from said image memory means in response to said mask data to prepare a write data and supplying the write data to said image memory means.

2. An image display apparatus according to claim 1, further comprising:

a first bit register, coupled to said barrel shifter, for holding a data supplied from said CPU indicating a bit shift amount for a source data of the image data delivered from said CPU to said barrel shifter; and a second bit register, coupled to said barrel shifter, for holding a data supplied from said CPU indicating another bit, shift amount for the image data delivered from said CPU to said barrel shifter and to be written into said image memory means via said write controller for the image data read from said image memory means;

wherein said barrel shifter parallelly shifts the image data delivered from said CPU based on the difference between the bit shift amounts held in said first and second bit registers, and transfers shifted image data to said write controller.

3. An image display apparatus according to claim 2, further comprising a mask register, coupled between said bus line and mask controller, for storing data transmitted from said CPU indicating a write bit width of the image data transmitted from said CPU and wherein said mask controller outputs the mask data indicating the write range to the write controller for the image data transmitted from said CPU in response to the shift amount data from said second bit register and the write bit width data from said mask register.

4. An image display apparatus according to claim 3, wherein said write controller selects predetermined bits of the image data delivered from said image memory means based on the mask data received from said mask controller, replaces the selected bits with a combined data of the image data received from said image memory means and the image data received via said barrel shifter, and transmits the combined data and the remaining data of the image data received from said image memory means to said image memory means.

5. An image display apparatus according to claim 4, further comprising an operation register, coupled between said CPU and said write controller, for holding an operation command data delivered from said CPU, wherein said write controller prepares said combined data in response to the operation command data transmitted from said operation register.

6. An image display apparatus comprising:

a display;

bit map type image memory means for storing image data;

a character generator, coupled to a CPU bus line, including a memory having dot matrix data of character patterns sequentially stored word by word in a scan line arrangement direction;

a DMA controller for controlling data transfer between said character generator and said image memory means;

a CPU, coupled to said DMA controller and to said character generator via said bus line, for accessing said character generator and said image memory means to control the data stored in said image memory means and setting a command to access said image memory means for effecting said data transfer by said DMA controller;

display controller means, coupled to said CPU via said bus line and to said image memory means, for reading out the data stored in said image memory means in response to a command from said CPU and transmitting said readout data to said display;

address translation means responsive to a memory access command from said CPU for translating an image memory access address sequence transmitted from said DMA controller into an access address sequence in a scan line direction when the image memory access address sequence is in a scan line arrangement direction;

address selection means for selectively transmitting to said image memory means an access address from said display controller means, the access address from said CPU and the translated access address from said CPU via said address translation means;

a barrel shifter, coupled to said CPU via said bus line, for parallelly shifting data delivered from said CPU by a designated number of bits at a time;

a mask controller, coupled to said CPU via said bus line, for producing a mask data for limiting a write range of the data delivered from said CPU; and a write controller, coupled to said barrel shifter, said mask controller and to said image memory means, for combining the data received from said barrel shifter with the data read from said image memory means in response to said mask data to prepare a write data and supplying the write data to said image memory means.

7. An image display apparatus according to claim 6, further comprising:

a first bit register, coupled to said barrel shifter, for holding a data supplied for from said CPU for indicating a bit shift amount for a source data of the image data delivered from said CPU to said barrel; and a second bit register, coupled to said barrel shifter, for holding a data delivered from said CPU indicating another bit shift amount for the image data delivered from said CPU to said barrel shifter and to be written into said image memory means via said write controller for the image data read from said image memory means;

wherein said barrel shifter parallelly shifts the image data delivered from said CPU based on the difference between the bit shift amounts held in said first and second bit registers, and transfers shifted image data to said write controller.

8. An image display apparatus according to claim 7, further comprising a mask register, coupled between said CPU and said mask controller, for storing a data transmitted from said CPU indicating a write bit width of the image data delivered from said CPU, and wherein said mask controller outputs the mask data indicating the write range to the write controller for the image data delivered from said CPU in response to the shift amount data from said second bit register and the write bit width data from said mask register.

9. An image display apparatus according to claim 8, wherein said controller selects predetermined bits of data delivered from said image memory means based on the mask data from said mask controller, replaces the selected bits with a combined data of the image data received from said image memory means and the image data received from said barrel shifter, and transmits the combined data and the remaining data of the image data received from said image memory to said image memory.

10. An image display apparatus according to claim 9, further comprising an operation register, coupled between said CPU and said write controller, for holding an operation command data supplied from said CPU, wherein said write controller prepares said combined data in response to the operation command data transmitted from said operation register.

11. An image display information processing apparatus comprising:

bit map type image memory means for storing image data;

a character generator, coupled to a CPU bus line, including a memory having dot matrix data of character patterns stored word by word in sequence in a scan line arrangement direction;

a CPU for accessing said character generator and said image memory, via said CPU bus line, to control the data stored in said image memory;

a display;

display controller means, coupled to said CPU via said bus line and to said image memory means, for reading out the data stored in said image memory means in response to a command from CPU and transmitting said data to said display;

address translating means for translating an image memory access address sequence supplied from said CPU, via said bus line, to an access address sequence in a scan line direction when the image memory access address sequence is in a scan line arrangement direction;

address selecting means for selectively transmitting to said image memory means an access address from said display controller means, the access address from said CPU memory and the translated access address from said CPU via said address translation means; and image memory controller means for supporting a graphic process by said CPU in synchronism with a write data from said CPU to said image memory means, said image memory controller means including:

a barrel shifter, coupled to said CPU bus line, for parallelly shifting data delivered from said CPU by a designated number of bits at a time, a mask controller, coupled to said CPU bus line, for producing a mask data for limiting a write range of the data delivered from said CPU, and a write controller, coupled to said barrel shifter, said mask controller and to said image memory means, for combining data received from said barrel shifter with the data read from said image memory means in response to said mask data to prepare a write data and supplying the write data to said image memory means.

12. An image display information processing apparatus according to claim 11, further comprising:

a first bit register, coupled to said barrel shifter, for holding a data supplied from said CPU for indicating a bit shift amount for a source data of the image data delivered from said CPU to said barrel shifter; and a second bit register, coupled to said barrel shifter, for holding a data supplied from said CPU indicating another bit shift amount for the image data delivered from said CPU to said barrel shifter and to be written into said image memory means via said write controller for the image data read from said image memory means;

wherein said barrel shifter parallelly shifts the image data delivered from said CPU based on the difference between the bit shift amounts held in said first and second bit registers, and transfers shifted image data to said write controller.

13. An image display information processing apparatus according to claim 12, further comprising a mask register, coupled between said bus line and said mask controller, for storing data transmitted from said CPU indicating a write bit width of the image data transmitted from said CPU and wherein said mask controller outputs the mask data indicating the write range to the write controller for the image data transmitted from said CPU in response to the shift amount data from said second bit register and the write bit width data from said mask register.

14. An image display information processing apparatus according to claim 13, wherein said write controller selects predetermined bits of the image data delivered from said image memory means based on the mask data received from said mask controller, replaces the selected bits with a combined data of the image data received from said image memory means and the image data received via said barrel shifter, and transmits the combined data and the remaining data of the image data received from said image memory means to said image memory means.

15. An image display information processing apparatus according to claim 14, further comprising an operation register, coupled between said CPU and said write controller for holding an operation command data delivered from said CPU, wherein said write controller prepares said combined data in response to the operation command data transmitted from said operation register.

16. An image display information processing apparatus comprising:

a display;

bit map type image memory means for storing image data;

a character generator, coupled to a CPU bus line, including a memory having dot matrix data of character patterns sequentially stored word by word in a scan line arrangement direction;

a DMA controller for controlling data transfer between said character generator and said image memory means;

a CFU, coupled to said DMA controller and to said character generator via said bus line, for accessing said character generator and said image memory means to control the data stored in said image memory means and setting a command to access said image memory means for effecting said data transfer by said DMA controller;

display controller means, coupled to said CPU via said bus line and to said image memory means, for reading out the data stored in said image memory means in response to a command from said CPU and transmitting said readout data to said display;

address translation means responsive to a memory access command from said CPU for translating an image memory access address sequence transmitted from said DMA controller into an access address sequence in a scan line direction when the image memory access address sequence is in a scan line arrangement direction;

address selection means for selectively transmitting to said image memory means an access address from said display controller means, the access address from said CPU and the translated access address from said CPU via said address translation means;

image memory controller means for supporting a graphics process by said CPU in synchronism with a write data from said CPU to said image memory means, said image memory controller means including:

a barrel shifter, coupled to said CPU via said bus line, for parallelly shifting data delivered from said CPU by a designated number of bits at a time, a mask controller, coupled to said CPU via said bus line, for producing a mask data for limiting a write range of the data delivered from said CPU, and a write controller, coupled to said barrel shifter, said mask controller and to said image memory means, for combining the data received from said barrel shifter with the data read from said image memory means in response to said mask data to prepare a write data and supplying the write data to said image memory means.

17. An image display information processing apparatus according to claim 16, further comprising:

a first bit register, coupled to said barrel shifter, for holding a data supplied from said CPU indicating a bit shift amount for a source data of the image data delivered from said CPU to said barrel shifter; and a second bit register, coupled to said barrel shifter, for holding a data delivered from said CPU indicating another bit shift amount for the image data delivered from said CPU to said barrel shifter and to be written into said image memory means via said write controller, for the image data read from said image memory means;

wherein said barrel shifter parallelly shifts the image data delivered from said CPU based on the difference between the bit shift amounts held in said first and second bit registers, and transfers shifted image data to said write controller.

18. An image display information processing apparatus according to claim 17, further comprising: a mask register, coupled between said CPU and said mask controller, for storing a data transmitted from said CPU indicating a write bit width of the image data delivered from said CPU and wherein said mask controller outputs the mask data indicating the write range to the write controller for the image data delivered from said CPU in response to the shift amount data from said second bit register and the write bit width data from said mask register.

19. An image display information processing apparatus according to claim 18, wherein said write controller selects predetermined bits of the image data delivered from said image memory means based on the mask data from said mask controller, replaces the selected bits with a combined data of the image received from said image memory means and the image data received from said barrel shifter, and transmits the combined data and the remaining data of the image data received from said image memory to said image memory.

20. An image display information processing apparatus according to claim 19, further comprising an operation register, coupled between said CPU and said write controller, for holding an operation command data supplied from said CPU, wherein said write controller prepares said combined data in response to the operation command data transmitted from said operation register.

* * * * *